United States Patent
Tang et al.

(10) Patent No.: US 9,401,869 B1
(45) Date of Patent: Jul. 26, 2016

(54) SYSTEM AND METHODS FOR SHARING MEMORY SUBSYSTEM RESOURCES AMONG DATACENTER APPLICATIONS

(71) Applicant: Google Inc., Mountain View, CA (US)

(72) Inventors: Lingjia Tang, Charlottesville, VA (US); Jason Mars, Charlottesville, VA (US); Robert Hundt, Piedmont, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/908,831

(22) Filed: Jun. 3, 2013

Related U.S. Application Data

(60) Provisional application No. 61/655,360, filed on Jun. 4, 2012.

(51) Int. Cl.
*G06F 15/177* (2006.01)
*H04L 12/911* (2013.01)

(52) U.S. Cl.
CPC .................. *H04L 47/70* (2013.01)

(58) Field of Classification Search
CPC .................................. H04L 47/70
USPC ........................................ 709/220
See application file for complete search history.

(56) References Cited

U.S. PATENT DOCUMENTS

| | | | | |
|---|---|---|---|---|
| 7,499,933 | B1* | 3/2009 | Simpson | G06F 9/44505 |
| 7,757,214 | B1* | 7/2010 | Palczak | G06F 9/5083 709/223 |
| 8,700,846 | B2* | 4/2014 | Qi | G06F 3/0605 711/114 |
| 2009/0210360 | A1* | 8/2009 | Sankar | G06F 9/44505 706/10 |
| 2011/0012902 | A1* | 1/2011 | Rajagopalan | G06T 11/206 345/440 |
| 2011/0270857 | A1* | 11/2011 | Bommireddipalli | G06F 17/30595 707/758 |
| 2013/0117424 | A1* | 5/2013 | Colyer | G06F 9/44505 709/221 |

* cited by examiner

*Primary Examiner* — Ario Etienne
*Assistant Examiner* — Sahera Halim
(74) *Attorney, Agent, or Firm* — Honigman Miller Schwartz and Cohn LLP

(57) ABSTRACT

Systems and methods for mapping applications onto system resource of a computing platform are discussed. The computing platform may receive, using control circuitry, a request to run a plurality of applications on a computing platform having a plurality of system resources. The computing platform may determine a plurality of mapping configurations for the plurality of applications onto the plurality of system resources. The computing platform may execute the plurality of applications with each of the plurality of mapping configurations. The computing platform may determine at least one performance metric based on the executed plurality of applications for each of the plurality of mapping configurations. The computing platform may select a selected mapping configuration among the plurality of mapping configurations based on at least one determined performance metric.

18 Claims, 4 Drawing Sheets

400

SYSTEM AND METHODS FOR SHARING MEMORY SUBSYSTEM RESOURCES AMONG DATACENTER APPLICATIONS

CROSS-REFERENCE TO RELATED APPLICATIONS

This application claims the benefit of U.S. provisional application No. 61/655,360 filed on Jun. 4, 2012, the contents of which is hereby incorporated by reference herein.

BACKGROUND

As datacenters that provide large scale web services emerge as important computing environments, understanding the interaction between datacenter applications and the underlying computing architecture is becoming increasingly important. Managing how applications map onto the various resources in the computing architecture is an important step to achieving improved performance. However, currently there is little understanding about the interaction between datacenter applications and the underlying computer architecture. As a result of this lack of understanding, modern datacenters assign applications to resources in an ad hoc fashion, without clear knowledge of how applications and the underlying architecture they execute on interact. This ad hoc assignment can hinder performance and cause destructive interference among multiple applications or even within the same application.

SUMMARY

Accordingly, systems and methods disclosed herein provide techniques for mapping applications onto system resources of a computing platform. Certain implementations relate to a system for managing system resources on a server. The computing platform may include control circuitry configured to control the operation of the computing platform. Processes and operations performed by the server may be implemented using the control circuitry. The computing platform may receive a request to run a plurality of applications on a computing platform having a plurality of system resources. The computing platform may determine a plurality of mapping configurations for the plurality of applications onto the plurality of system resources. The computing platform may execute the plurality of applications with each of the plurality of mapping configurations. The computing platform may determine at least one performance metric based on the executed plurality of applications for each of the plurality of mapping configurations. The computing platform may select a selected mapping configuration among the plurality of mapping configurations based on the at least one determined performance metric.

Certain implementations relate to a system for managing system resources on a server. The computing platform may include control circuitry configured to control the operation of the computing platform. Processes and operations performed by the server may be implemented using the control circuitry. The computing platform may receive a request to run a plurality of applications on a computing platform having a plurality of system resources. The computing platform may determine a plurality of resource sharing metrics for each of the plurality of applications. The computing platform may determine a priority for each of the plurality of applications. The computing platform may compare the plurality of resource sharing metrics and the priority between each of the plurality of the applications. The computing platform may determine based on the comparison, a mapping of the plurality of applications onto the plurality of system resources of the computing platform.

BRIEF DESCRIPTION OF THE DRAWINGS

The above and other advantages of the disclosure will be apparent upon consideration of the following detailed description, taken in conjunction with the accompanying drawings, in which like reference characters refer to like parts throughout, and in which.

DETAILED DESCRIPTION

Figure 1:
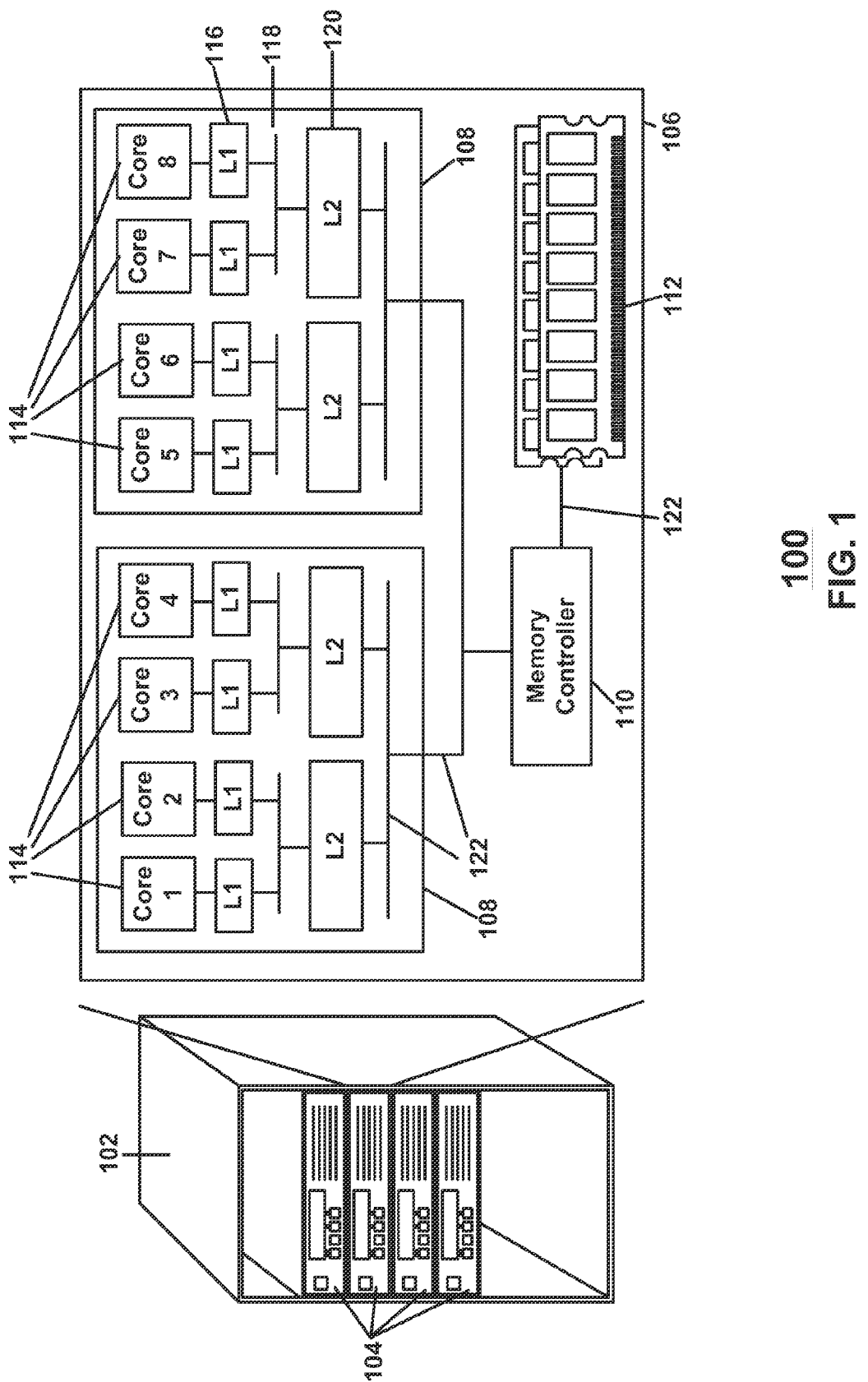
FIG. 1 is a block diagram depicting an implementation of a computing platform, according to an illustrative implementation of the disclosure.

To provide an overall understanding of the disclosure, certain illustrative implementations will now be described, including systems and methods for sharing memory subsystem resource among datacenter applications, on a computing platform. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The systems and methods described herein are directed to mapping threads of an application onto processor cores of a computing platform. The systems and methods described herein further include mapping threads of an application onto a computing platform with shared memory subsystems to improve the performance of the application. To improve performance, multiple mapping techniques are disclosed.

Internet service datacenters and cloud computing economies of scale have gained significant momentum in today's computing environments. This momentum is fueled not only by consumer demand, but by the continued performance increase in the computing platforms that make up the datacenters. These computing platforms are increasing computational performance by increasing not only the number of processors within a server but also the number of processing cores within each processor. These processing cores share a number of components like memory, processor caches and buses. As the number of processing cores increases, managing the processing cores and the shared components become extremely important to the computational performance of the computing platform.

In modern datacenters, application scheduling is done in a hierarchical fashion. A global application scheduler manages a number of machines and selects a particular machine for each application based on the amount of memory or the number of processor cores the application requires. Once a machine is selected, the application, and its individual threads, is then managed by the OS scheduler. The OS scheduler decides how the application threads are mapped to the individual processing cores of this machine. At this level, general purpose system software such as the Linux kernel may be adapted for, and used, in the datacenter for finer grain scheduling.

Current application scheduling does not take memory resource sharing into account. The scheduler's thread-to-core mapping is determined without regard to, or knowledge of, the application characteristics or the underlying resource sharing topology. The state-of-the-art kernel scheduler focuses on load balancing and prioritizes cache affinity to reduce cache warm-up overhead. Although developers can specify which cores to use manually, this must be done on an application by application, and architecture by architecture basis. As a result, this option is seldom used as it places a significant burden on the developer. Furthermore, when co-locating threads from multiple applications, the optimal thread to core mappings changes.

One approach to mapping an application's threads onto a computing platform, when running alone, as well as with threads of other applications, may be by leveraging knowledge of each application's sharing characteristics. Examples of these sharing characteristics include the amount of sharing between threads, the amount of memory bandwidth the application requires, and the cache footprint of the application. By determining an application's sharing characteristics and comparing them with other application's sharing characteristics, a thread to core mapping may be generated.

Alternatively, an online adaptive learning approach may be used to generate thread to core mappings in the datacenter, as it is agnostic to applications' sharing characteristics. Using an online adaptive learning approach, allows thread to core mappings to be generated without determining sharing characteristics about the applications. This may be beneficial if the applications or their sharing characteristics are not known ahead of time. The online adaptive learning approach may be able to reconfigure the thread to core mappings after specific pre-determined intervals of time or due to a change in the system resources available to the computing platform.

Although each of these approaches are discussed with regards to a computing platform, the thread to core mapping that is generated by a computing platform may be used on other computing platforms that execute the same applications. This may be beneficial since many of the computing platforms in the datacenter may have similar system resource characteristics and the computation and system resource cost of generating and selecting a thread to core mapping configuration may be saved for other computing platforms that can use the same thread to core mapping configuration.

Datacenter Compute Platform

FIG. 1 is a block diagram depicting an implementation of a computing platform 106, according to an illustrative implementation of the disclosure. Modern datacenters include servers 104 located in server racks 102. These servers 104 include components that make up computing platform 106, which datacenter applications are processed on. The computing platform 106 may include control circuitry configured to control the operation of the computing platform. Processes and operations performed by the computing platform may be implemented using the control circuitry. The computing platforms 106 receive computer instructions that make up the datacenter applications and process the instructions along with received data. The computing platforms 106 include a variety of different components including processors 108, memory controllers 110, and memory 112. Each of these components communicates with each other through a variety of data buses 122.

Processors 108 include multiple components. These components include processor cores 114, processor caches 116 and 120, and processor data buses 118. The processor cores 114 process the computer instructions that make up the datacenter applications. The processor cores 114 utilize the different processor caches 116 and 120 and communicate over the processor buses 118. An example computing platform 106, shown in FIG. 1, includes two processors 108, each with four processor cores 114, wherein each processor core 114 communicates with a first level cache (L1) 116, and every two processor cores 114 share a second level cache (L2) 120. Processor cores 114 and processor caches 116 and 120 may communicate with each other through processor buses 118. All the processors 108 may share the same memory 112, and communicate to memory 112 through memory controller 110. Computing platform 106 may be configured in many different ways. The number of processors 108, the number of processor cores 114, the number of levels of cache 116 and 120, the configuration of the processor buses 118 and data buses 122, the number of the processor buses 118 and data buses 122, how the processor 118 components are connected, and the number of memory controllers 110 and memory 112, may be selected and configured in any combination, and is not limited to the example described in FIG. 1.

Figure 2:
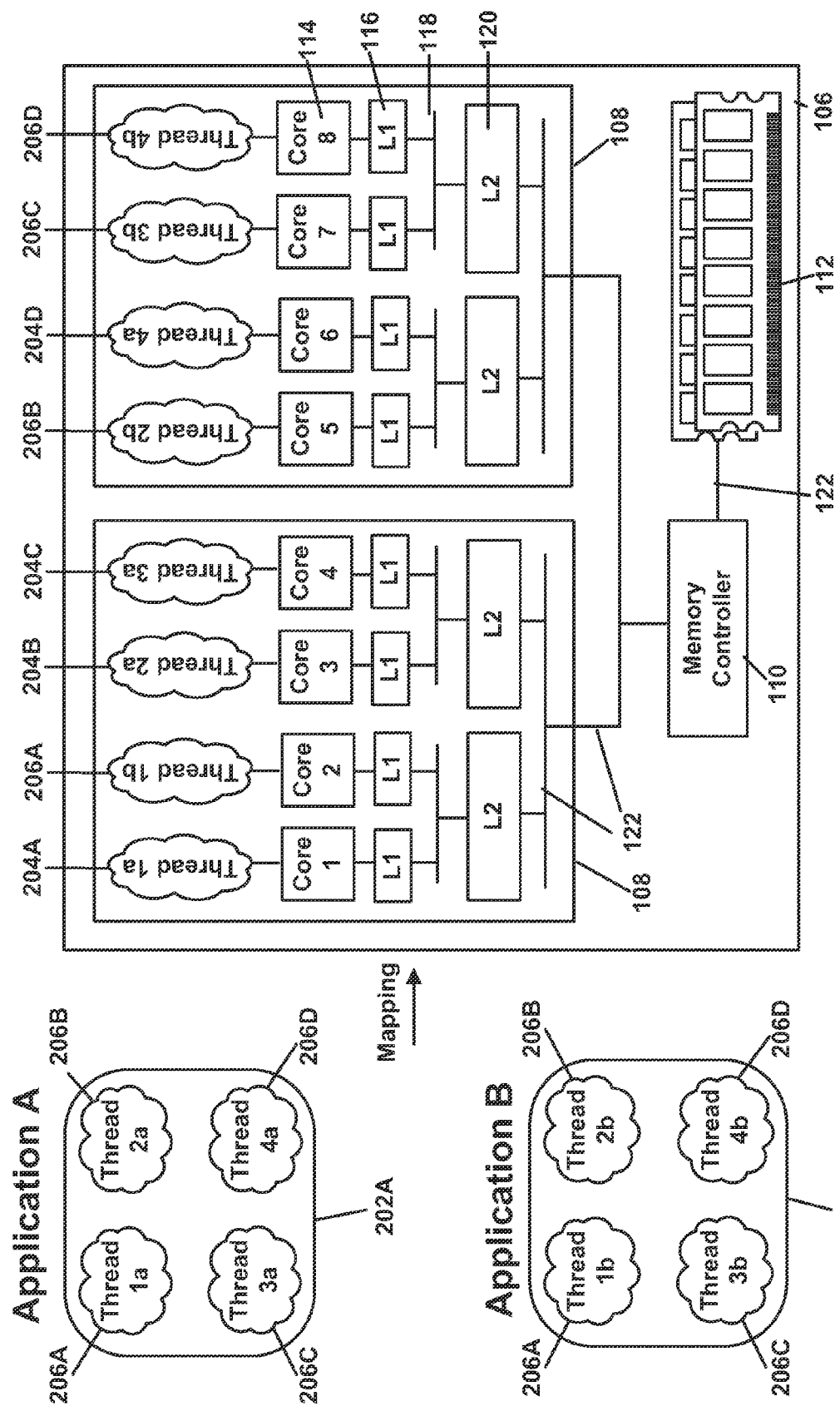
FIG. 2 is block diagram depicting threads of multiple applications being mapped onto a computing platform, according to an illustrative implementation of the disclosure.

On multi-processor multi-core computing platforms 106, processing cores 114 may or may not share certain memory resources including the last level cache (LLC) 120, which is the last layer of cache shown as L2 in FIG. 2, and memory bandwidth. Memory bandwidth may be shared through a data bus 122 connected to each processor 108. Thus for a given subset of processing cores 114, there may be a particular sharing configuration among the cores 114 of that subset. For example, for two processing cores 114, there may be three possible sharing configurations among two cores 114: the two processing cores 114 sharing the same LLC 120 and data bus 122 (such as Core 1 and Core 2), the two processing cores 114 each using a different LLC 120 but sharing the same data bus 122 (such as Core 1 and Core 3), and the two processing cores 114 each using a different LLC 120 and data bus 122 (such as Core 1 and Core 5). The cache hierarchy, memory topology, and the number of processors 108, and the number of processing cores 114 of the specific machine determine the possible sharing configurations among multiple processing cores 114.

These computing platforms process the datacenter applications and receive and produce data based on the instructions of the applications. These applications may be mapped or scheduled onto these computing platforms in various configurations.

Application Mapping onto Compute Platform

FIG. 2 is block diagram depicting threads of multiple applications 202A-B being mapped onto a computing platform 106, according to an illustrative implementation of the disclosure. Datacenter applications 202A and 202B may be configured to run on computing platform 106. Datacenter applications 202A-B may include multiple application threads, 204A-D and 206A-D. In the example shown in FIG. 2, each application 202A-B includes four application threads, 204A-D and 206A-D. These application threads 204A-D and 206A-D include computer instructions, which the processor 108 may interpret, and may work together on the computing platform 106 to process received data. Each application thread, 204A-D and 206A-D, may be mapped onto processor cores 114. Mapping an application thread, 204A-D and 206A-D, onto a processor core 114 indicates to the computing platform 106 that the application thread, 204A-D and 206A-D, should be run on that specific processor core 114. As an example, in FIG. 2, each application thread, 204A-D and 206A-D, is mapped onto a different processor core 114.

Although the example shows one application thread, 204A-D and 206A-D, being mapped per processor core 114, multiple application threads, 204A-D and 206A-D, may be mapped onto the same processor core 114. Additionally, application threads, 204A-D and 206A-D, of different applications 202A-B, can be mapped together on the same processor core 114. The number of threads of an application may vary based on the application itself. In certain implementations, the application may dynamically change the number of threads within the application based on application parameters. These application parameters may be based on data received by the application, or based on the system resources on the computing platform 106.

Determining which processor cores 114 to map application threads of the same application may affect the performance of the application. For example, if threads of an application do not share data, then mapping all the application threads such that they share the same LLC 120 may be worse than mapping each thread to utilize a different LLC 120. This may be because application threads of the same application may require different data, and because the LLC 120 is limited in size, the threads would have to compete for placing its data in the LLC 120, causing cache pressure. Threads competing within a LLC 120 may lead to performance degradation due to the cache pressure. By utilizing multiple LLCs 120, the total size of cache available to the application threads is larger, thus reducing the cache pressure on each LLC 120. Alternatively, if the application threads share significant amounts of data among each thread, then the application threads may want to be mapped to use the same LLC 120. If the application threads were to be mapped to use different LLCs 120, then the data within each LLC 120 would have to be passed between the different LLCs 120, introducing unnecessary overhead to the application and to the computing platform 106, and thus degrading performance. In addition to data sharing, determining which processor cores 114 to map the application threads of the same application may also add pressure to the data buses 122. If the amount of traffic required by each of the application threads is high, then mapping the application threads such that they utilize the maximum number of data buses 122 may improve performance. By utilizing multiple data buses 122, the total effective data bus bandwidth may be maximized, improving performance since more data can be transmitted at a time. However, if the application threads communicate frequently with each other, then mapping the application threads to processors cores 114, such that the latency to communicate between threads is minimized may be the most beneficial. Determining the characteristics of the application and its threads may lead to determining the best mapping of application threads to processor cores 114 to maximize the performance of the application.

Application Mapping Processes

Applications may be first scheduled by a global application scheduler. The global application scheduler may select, based on the application, which server it should run on, based on the amount of memory 112, the number of processors 108, or the number of processor cores 114 the application requires. Once a server is selected, the application, and its threads may be mapped onto the computing platform 106 of the server 104. In certain implementations, an OS scheduler may allow the user to manually specify how application threads are mapped onto processor cores 114. The application scheduling and mapping processes for the global and server level are discussed. These processes take into consideration the application characteristics and the underlying configuration of the computing platform 106 to generate a scheduling and mapping configuration which the servers 104 and computing platforms 106 may be configured with.

Resource-Characteristics Based Application Thread to Processor Core Mapping

Based on an application's characteristics, thread-to-core mappings that take advantage of the memory sharing topology may be determined. An application may be characterized based on its potential bottlenecks, for example bus usage, shared cache usage and the level of data sharing. Thread-to-core mapping should maximize the potential benefit from sharing and avoid mapping threads that have the same resource bottlenecks. For example, if the application has a high level of data sharing, the mapping should allow its threads to share resources such as LLC 120. Additionally, a performance priority should be determined based on the latency-sensitivity of an application over other application scheduled on the same computing platform 106. This may ensure that applications with high latency-sensitivity have priority in performance over application with lower latency-sensitivity.

Figure 3:
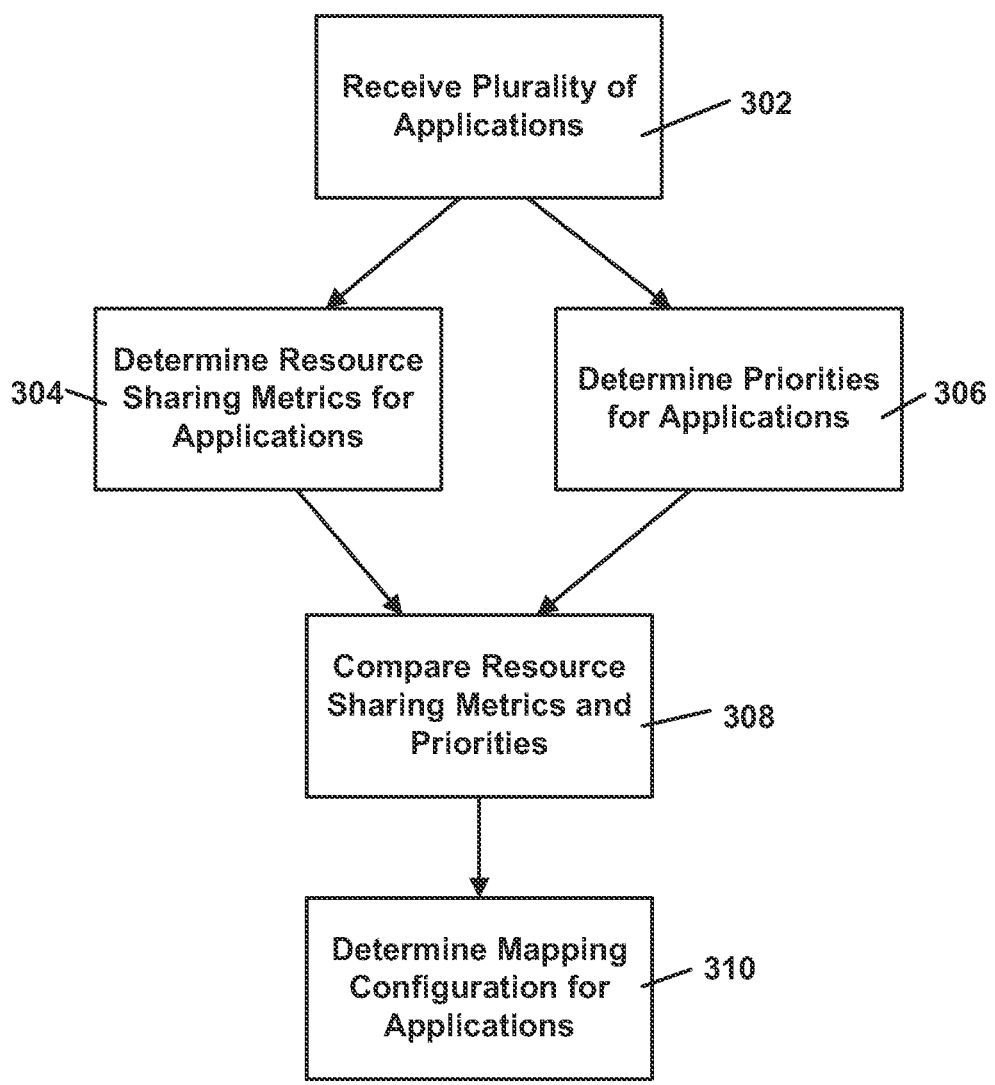
FIG. 3 is a block diagram depicting a method for mapping applications onto a computing platform, according to an implementation of the disclosure.

FIG. 3 is a block diagram depicting a method for mapping applications onto computing platform 106, according to an implementation of the disclosure. At 302, computing platform 106 may be configured to receive a request to run a plurality of applications. In another implementation, computing platform 106 may be configured to receive a request to run a single application. At 304, computing platform 106 may be configured to determine one or more resource sharing metrics for each application. The resource sharing metrics may include memory bandwidth usage, cache data sharing, a cache footprint, and processor core resource usage. At 306, computing platform 106 may be configured to determine a priority for each application. At 308, computing platform 106 may be configured to compare the resource sharing metrics and the priorities among each of the applications. Based on the comparison of the resource sharing metrics and the priorities, at 310, computing platform 106 may be configured to determine a mapping configuration for the threads of each application onto the processor cores 114 of computing platform 106. For example, applications with high priorities may be mapped onto system resources with applications with low priorities and applications with high resource sharing metrics may be mapped onto system resources with application with low resource sharing metrics. In another implementation, computing platform 106 may be configured to determine a mapping configuration for the threads of the applications onto the system resources of computing platform 106. For example, the applications and threads of each application may be configured to use a selected amount of a system resource. For example, one application may be allocated 70 percent of the LLC 120, while another application is assigned 30 percent of the LLC 120. The amount of the system resources allocated to each application may vary based on the demands of each application or determined based on system resource availability.

In certain implementations, the resource sharing metrics may be based on data sharing metrics, bus usage metrics, or LLC footprint metrics. Data sharing metrics may be based on the percentage of cache lines that are in a shared state. If the percentage of cache lines that are in a shared state are greater than a pre-determined threshold, then the application may be considered as a high data sharing application. Alternatively, if the percentage of cache lines that are in a shared state are less than a pre-determined threshold, then the application may be considered as a low data sharing application. Although, two levels of data sharing are described, there may be multiple threshold values used, corresponding to multiple levels of sharing. Bus usage metrics may be based on the amount of bus bandwidth used on either the data buses 122 or processor buses 118, or both. The bus usage metric may indicate the amount of memory bandwidth used. The bus usage metric may also indicate how much communication is performed between threads of an application. In certain implementations, the amount of bus bandwidth used may be determined based on a value stored in internal counter circuitry on the processor 108. One example of internal counter circuitry on the processor is BUS_TRANS_BURST, which is located on an INTEL processor, but any internal counter circuitry on any processor 108 that indicates the amount of bus bandwidth used may be used. LLC footprint metrics may be based on the LLC miss rate. The LLC miss rate may be determined based on a value stored in internal counter circuitry on the processor 108. These metrics are examples of resource sharing metrics that computing platform 106 may be configured to determine. Other metrics that determine the usage of system resources on the computing platform 106 may also be determined. In certain implementations, the resource sharing metrics of each application are compared with each other. Based on the comparison of the resource sharing metrics of each application, the applications are mapped onto the system resources to maximize the performance of the applications onto the system resources of the computing platform 106.

In certain implementations, determining the priority for each application may include determining the latency sensitivity of the application. Applications may have different priorities. Higher priority may be assigned to an application based on its latency sensitivity. The latency sensitivity indicates how sensitive an application may be to changes in a resource sharing metric. If resources decreased from the application, the latency of response for that application may drop dramatically. For example, latency sensitive applications, like web search and database, are considered high priority applications because their latency of response is highly sensitive to changes in resource sharing metrics, whereas applications like image processing and background maintenance may be considered lower priority applications because their latency of response does not change in response to changes in resource sharing metrics. The lower priority applications may not have as strict timing requirements as higher priority applications may require. Thus degradation in performance may not be as important. Alternatively, priority may be assigned based on the importance of the application. Applications which are more critical to the operation of the datacenter may have higher priority than applications which are not as critical. For example, the application web search may be the main critical application in the datacenter, whereas maintenance application, such as background maintenance, may be of low importance and may not be essential to the datacenter. In certain implementations, the priorities of each application are compared with each other. Applications with higher priorities are mapped onto the system resources with applications with lower priorities. It should be known that any technique for assigning priorities to applications may be used, such as determining priority based on system resource usage, determining priority based on an application completion deadline, or determining priority based on a monetary cost metric for completing the application.

Adaptive Based Application Thread to Processor Core Mapping

The performance of a thread to processor core 114 mapping configuration may change when the number of threads of an application, the applications running on the computing platform 106, or the availability of system resources in the computing platform 106 changes. To account for these variations, an adaptive learning approach may provide improved performance. Using a competition heuristic to adaptively search for the optimal thread to core assignment for a given set of threads, these variations can be accounted for. This approach may include two phases: a learning phase and an execution phase. These phases may be performed together or separately.

During the learning phase, various thread to processor core 114 mappings may be generated for a set of applications. The thread to processor core 114 mappings may be compared to each other in order to determine which mapping achieves the greatest performance. Each thread to core mapping may be given an equal amount of time to execute, and the mapping which provides the greatest performance for a set of applications may be selected. Although a large amount of thread to processor core 114 mappings may be generated, because most of the memory topologies are symmetric, the number of equivalent mappings may be greatly reduced. For example, for a two processor core 114 mapping configuration, there may be three classes of mappings that represent three different sharing configurations. During the execution phase, the greatest performing thread to core mapping is run for a fixed or adaptive period of time before another comparison is held. In certain implementations, the greatest performing thread to processor core 114 mapping may be run indefinitely until a signal to change the thread to processor core 114 mapping is received.

Figure 4:
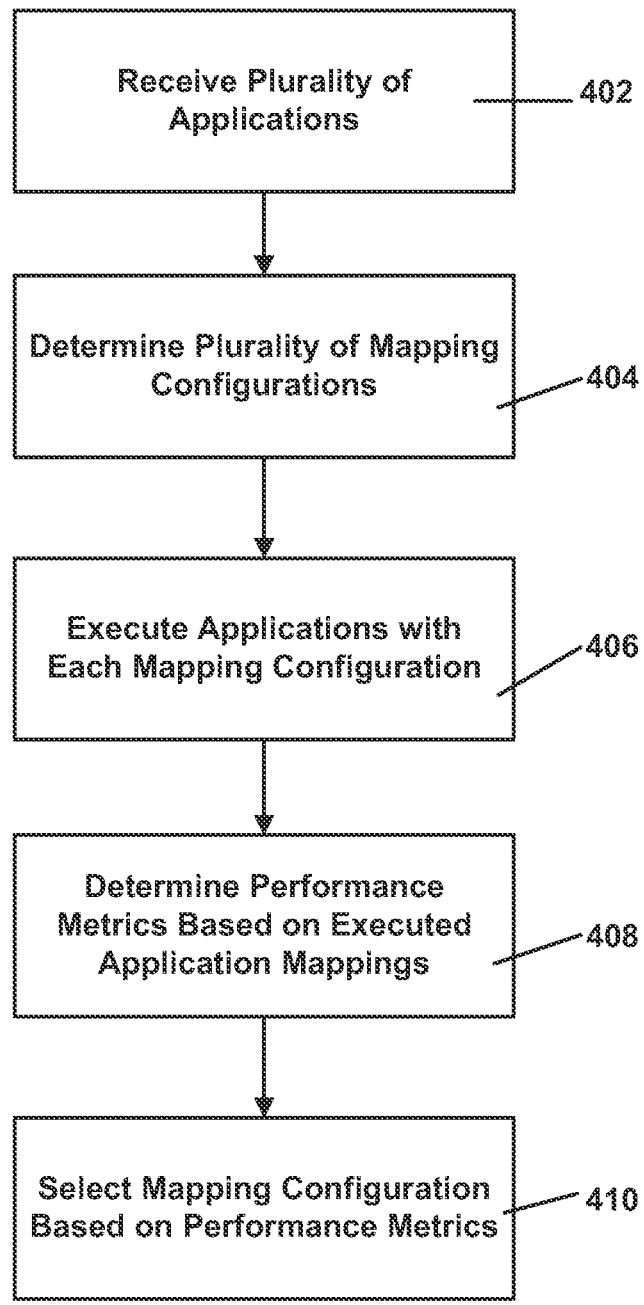
FIG. 4 is a block diagram depicting an alternative method for mapping applications onto a computing platform, according to an implementation of the disclosure.

FIG. 4 is a block diagram depicting an adaptive based method for mapping applications onto a computing platform 106, according to an implementation of the disclosure. At 402, computing platform 106 may be configured to receive a request to run a plurality of applications. In another implementation, computing platform 106 may be configured to receive a request to run a single application. At 404, computing platform 106 may be configured to determine one or more mapping configurations for the set of applications requested to run on the computing platform 106. At 406, each determined mapping configuration is executed for a pre-determined amount of time. At 408, after the determined mapping configuration has executed for the pre-determined amount of time, a performance metric is determined. At 410, once all the mapping configurations are executed, computing platform 106 may be configured to select the mapping configuration based on the performance metric for each executed mapping configuration.

In certain implementations, the performance metric may be application specific performance metrics or system specific performance metrics. Application specific performance metrics may include application throughput, application latency, and application performance. These application specific performance metrics may indicate how well the mapping configuration is performing for the set of applications with respect to the application itself. System specific performance metrics may include cache performance, processor utilization, memory bandwidth utilization, memory utilization network throughput, network bandwidth utilization, power usage, and system temperature. Each of these metrics may not indicate directly how the applications are performing, but may indicate how well the system resources on the computing platform 106 are being utilized. For example, low processor 108 utilization may indicate that the computing platform 106 is not being utilized properly.

In certain implementations, selecting the mapping configuration based on the performance metric for each executed mapping configuration may include comparing the performance metrics of each of the mapping configurations. Based on the comparison, the mapping configuration which includes the greatest performance metric may be selected. In certain implementations, the comparison may be based on multiple performance metrics for each of the executed mapping configurations. In certain implementations, multiple performance metrics may be used to generate a consolidated performance metric for the executed mapping configurations, wherein different pre-determined weights for each performance metric may be used based on their importance to weigh the performance metrics differently. The selected mapping configuration may be executed on computing platform 106 until an event indicating that a change in mapping configuration may be required. The event may include either a predetermined amount of time, or based on a performance metric. For example, if the processor 108 utilization becomes low, this may indicate to the computing platform 106 that the current mapping configuration is not performing well. Based on the event, computing platform 106 may be configured to determine a new mapping configuration by repeating method 400 of determining a mapping configuration. In certain implementations, the mapping configuration selected may be run indefinitely.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the disclosure. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Further, certain portions of the disclosure may be implemented as "logic" or a "component" that performs one or more functions. This logic may include hardware, such as an application specific integrated circuit or a field programmable gate array, software, or a combination of hardware and software.

The invention claimed is:

1. A method for mapping applications onto system resources of a computing platform, the method comprising:
    receiving, using control circuitry, a request to run a plurality of applications on a computing platform having a plurality of system resources;
    determining, using the control circuitry, a plurality of mapping configurations for the plurality of applications onto the plurality of system resources, each mapping configuration associated with a mapping of application threads for each of the applications onto the system resources;
    executing, using the control circuitry, the plurality of applications with each of the plurality of mapping configurations separately for a predetermined amount of time;
    determining, using the control circuitry, at least one performance metric for each mapping configuration after the plurality of applications execute for the predetermined amount of time;
    selecting, using the control circuitry, a selected mapping configuration among the plurality of mapping configurations based on the at least one performance metric determined for each associated mapping configuration; and
    executing the plurality of mapping configurations with the selected mapping configuration.

2. The method of claim 1, wherein selecting the selected mapping configuration comprises:
    determining if the at least one determined performance metric of a first mapping configuration is greater than the at least one determined performance metric of a second mapping configuration; and
    selecting the selected mapping configuration based on determining which of the at least one determined performance metric of the first mapping configuration and the second mapping configuration is greater.

3. The method of claim 1, wherein the at least one performance metric comprises at least one of an application specific performance metric or a system specific performance metric.

4. The method of claim 3, wherein the application specific performance metric comprises an application throughput, application latency, and application performance.

5. The method of claim 3, wherein the system specific performance metric comprises a cache performance, processor utilization, memory bandwidth utilization, memory utilization, network throughput, network bandwidth utilization, power usage, and system temperature.

6. The method of claim 1, further comprising reselecting, using the control circuitry, a reselected mapping configuration among the plurality of mapping configurations based on whether at least one predetermined criterion is met.

7. The method of claim 6, wherein the at least one of the predetermined criteria is a predetermined amount of time.

8. The method of claim 6, wherein the at least one of the predetermined criteria is based on a performance metric of the computing platform.

9. The method of claim 1, wherein the selected mapping configuration is always used for the plurality of applications on the computing platform.

10. A system for mapping applications onto system resources of a computing platform, the system comprising:
    control circuitry of the computing platform configured to execute instructions that cause the control circuitry to perform operations comprising:
        receiving a request to run a plurality of applications on the computing platform having a plurality of system resources;
        determining a plurality of mapping configurations for the plurality of applications onto the plurality of system resources, each mapping configuration associated with a mapping of application threads for each of the applications onto the system resources;
        executing the plurality of applications with each of the plurality of mapping configurations separately for a predetermined amount of time;
        determining at least one performance metric for each mapping configuration after the plurality of applications execute for the predetermined amount of time;
        selecting a selected mapping configuration among the plurality of mapping configurations based on the at least one performance metric determined for each associated mapping configuration; and
        executing the plurality of mapping configurations with the selected mapping configuration.

11. The system of claim 10, wherein the operations further comprise:
    determining if the at least one determined performance metric of a first mapping configuration is greater than the at least one determined performance metric of a second mapping configuration; and selecting the selected mapping configuration based on determining which of the at least one determined performance metric of the first mapping configuration and the second mapping configuration is greater.

12. The system of claim 10, wherein the at least one performance metric comprises at least one of an application specific performance metric or a system specific performance metric.

13. The system of claim 12, wherein the application specific performance metric comprises an application throughput, application latency, and application performance.

14. The system of claim 12, wherein the system specific performance metric comprises a cache performance, processor utilization, memory bandwidth utilization, memory utilization, network throughput, network bandwidth utilization, power usage, and system temperature.

15. The system of claim 10, wherein the operations further comprise reselecting a reselected mapping configuration among the plurality of mapping configurations based on whether at least one predetermined criterion is met.

16. The system of claim 15, wherein the at least one of the predetermined criteria is a predetermined amount of time.

17. The system of claim 15, wherein the at least one of the predetermined criteria is based on a performance metric of the computing platform.

18. The system of claim 10, wherein the selected mapping configuration is always used for the plurality of applications on the computing platform.

* * * * *